(12) United States Patent
Götzinger et al.

(10) Patent No.: US 10,988,321 B2
(45) Date of Patent: Apr. 27, 2021

(54) TRANSPORT DEVICE COMPRISING CARRIAGES GUIDED SUCH THAT THEY CAN MOVE ON A RAIL

(71) Applicant: WEISS GMBH, Buchen (DE)

(72) Inventors: Martin Götzinger, Buchen (DE); Lutz Neuweiler, Edingen-Neckarhausen (DE)

(73) Assignee: WEISS GmbH

(*) Notice: Subject to any disclaimer, the term of this patent is extended or adjusted under 35 U.S.C. 154(b) by 0 days.

(21) Appl. No.: 16/638,006

(22) PCT Filed: Jun. 20, 2018

(86) PCT No.: PCT/EP2018/066496
§ 371 (c)(1),
(2) Date: Feb. 10, 2020

(87) PCT Pub. No.: WO2019/029884
PCT Pub. Date: Feb. 14, 2019

(65) Prior Publication Data
US 2020/0165069 A1    May 28, 2020

(30) Foreign Application Priority Data

Aug. 11, 2017    (DE) .................... 10 2017 118 357.4

(51) Int. Cl.
*B65G 35/06*    (2006.01)
*B65G 17/42*    (2006.01)

(52) U.S. Cl.
CPC ............. *B65G 35/06* (2013.01); *B65G 17/42* (2013.01)

(58) Field of Classification Search
None
See application file for complete search history.

(56) References Cited

U.S. PATENT DOCUMENTS 1,793,261 A    3/1925   Stieglitz
2,049,850 A *   8/1936   Lytle .................... B65G 49/068
                                                         414/728

(Continued)

FOREIGN PATENT DOCUMENTS

DE    102012106548 A1    5/2014
EP        0340639 A1    11/1989
(Continued)

OTHER PUBLICATIONS

Linearsystem LS: Durchdachte, modulare Zellenbauweise. Published Jun. 2016—partial translation enclosed, p. 132-145.
(Continued)

*Primary Examiner* — Kavel Singh
(74) *Attorney, Agent, or Firm* — Dickinson Wright PLLC

(57) ABSTRACT

The present invention relates to a transport device for transporting objects along a transport track having a rail defining the transport track; at least one slide that is travelably guided at the rail; a coupling element which is provided at the slide and via which the slide can be driven; a first drive unit having a first drive means for driving the slid along a first transport section of the transport track; and a second drive having a second drive means for driving the slide along a second transport section of the transport track. The coupling element is configured to be in engagement in a shape fitting manner with the first drive means and to be in engagement in a force-fitting manner with the second drive means in the region of the second transport section.

16 Claims, 3 Drawing Sheets

(56) References Cited

U.S. PATENT DOCUMENTS

| | | | | |
|---|---|---|---|---|
| 3,771,258 | A * | 11/1973 | Charney | A01G 9/143 |
| | | | | 47/65 |
| 6,269,942 | B1 * | 8/2001 | Mader | B65G 23/32 |
| | | | | 198/795 |
| 7,392,633 | B2 * | 7/2008 | Heil | B65B 43/52 |
| | | | | 53/250 |
| 9,315,326 | B2 * | 4/2016 | Magni | B65G 17/005 |
| 2003/0014153 | A1 | 1/2003 | Frommenwiler et al. | |

FOREIGN PATENT DOCUMENTS

| | | |
|---|---|---|
| EP | 0792823 A1 | 9/1997 |
| EP | 0909728 A1 | 4/1999 |
| EP | 2418161 A1 | 2/2012 |
| EP | 2733094 A1 | 5/2014 |
| EP | 2873633 A2 | 11/2014 |

OTHER PUBLICATIONS

Official Communication from the European Patent Office for related International Application No. PCT/EP2018/066496; dated Sep. 27, 2018; 6 pages.

Official Communication from the German Patent Office for related German Application No. 102017118357.4; dated Jun. 11, 2018; 2 pages.

* cited by examiner

TRANSPORT DEVICE COMPRISING CARRIAGES GUIDED SUCH THAT THEY CAN MOVE ON A RAIL

CROSS-REFERENCES TO RELATED APPLICATIONS

This patent application is a 371 of International Application No. PCT/EP2018/066496, filed Jun. 20, 2018 which claims the priority of German Application No. 102017118357.4, filed Aug. 11, 2017, each of which are incorporated herein by reference in their entirety.

The present invention relates to a transport device for transporting objects along a transport track. The invention in particular relates to a transport device in accordance with the preamble of claim 1.

Such transport device that are occasionally also called linear transport systems serve in assembly and automation technology, for example, to transport workpieces in an exactly positioned manner to machining and/or assembly stations that are positioned along the transport track. The objects or workpieces to be transported can here be positioned on slides that are guided by a rail and can thus be traveled along said rail.

One or more drive units such as linear drives, belt drives, and/or so-called barrel cams are typically provided along the transport track to travel the slides. A slide, that is occasionally also called a workpiece carrier, can here be transported to a desired position in the region of the respective assembly station in an exactly positioned manner by means of a barrel cam, whereas the transport of the slides between two assembly stations can, for example, take place with the help of a belt drive. The drive of the slides by means of such a belt drive can here take place via a coupling element that is provided at the respective slide and that comes into engagement with force fitting with the belt or band of the belt drive so that the respective slide is driven along the rail or the transport, track due to the power transmission or friction locking between the belt and the coupling element.

If the rail is curved, in particular arcuately curved, in the region of a transport section of the transport track, the drive of the slides in the region of such a curved transport section of the transport track can, for example, take place by means of a rotating circular disk by means of which the slide is entrained via friction locking and thus driven in the region of the curved transport track—here also called a corner deflection.

If such a transport device, however, has two linear transport sections that are connected to one another via such a corner deflection, for example, the friction locking between the driven circular disk and the slide in the region of the corner deflection may not be sufficient under certain circumstances to transport the slide without slip in a vertical direction via the corner deflection from the one linear transport section to the other linear transport section.

It can furthermore be desirable also to be able to provide at least one assembly station in the region of such a corner deflection so that a workpiece positioning in an exactly positioned manner should be achieved by means of the drive unit in the region of the corner deflection.

It is therefore the underlying object of the invention to further develop a transport device of the category such that the previously described requirement can be met.

This object is satisfied by a transport device having the features of claim 1 and in particular in that the coupling element is configured to enter into engagement with the second drive means in the region of the second transport section in a shape fitting manner or via shape fitting or in a shape fitting and force-fitting manner, that is via a combined shape fitting and force fitting.

Unlike in the region of the first transport section of the transport track, the slide is therefore not, for instance, driven via simply force fitting or friction locking, but via shape fitting or combined force fitting and shape fitting in the region of the second transport section in the region of which the rail or the transport track can be arcuately curved to implement a corner deflection.

Since the slide is driven by the second drive means via the coupling element by means of shape fitting, a slip-free force fitting is possible between the drive means of the second drive unit and the coupling element so that a vertical corner deflection can also be implemented in the region of the second transport section that is vertically oriented and that connects two transport sections arranged above one another in a vertical plane to one another—one linear transport section in the forward run to the corner deflection and one linear transport section in the return run from the corner deflection.

Due to the fact that the coupling element moves into engagement with shape fitting with the second drive means in the region of the second transport section, the relative position between the slide and the second drive means can furthermore be exactly determined so that an exact positioning of the slide can also be implemented in the desired manner in the region of the second transport section by means of the second drive unit as can be desirable as part of a cyclic operation in the course of which an assembly station located in the region of the second transport section has to be exactly traveled to by a slide.

Preferred embodiments of the invention will now be looked at in the following, with further embodiments also being able to result from the dependent claims, from the description of the Figures, and from the Figures themselves.

The first drive unit can thus, for example, be configured as a belt drive having a revolving belt or strap as a first drive means. Alternatively to this, a chain drive having a revolving chain as a first drive means could, for example, also be used as the first drive means, with a plurality of frictions shoes being provided on the chain for the friction locking engagement with the coupling element of the slide.

In contrast, the second drive unit in accordance with an embodiment can be configured as a toothed drive having a revolving toothed belt or a toothed wheel as the second drive means. The toothed belt is here oriented such that its toothed arrangement is outwardly disposed to be able to move into engagement with shape fitting with the coupling element so that a slip between the coupling element and the second drive means can be largely precluded.

Since the second drive means is configured as a revolving toothed belt or as a toothed wheel, the side can be driven in the desired manner in the region of a second transport section formed as a corner deflection by means of the second drive unit. For this purpose, the rail in accordance with an embodiment has a curved design in the region of the second transport section of the transport track, and indeed in particular an arcuately curved design, with the second drive means and in particular its engagement surface in the form of the toothed arrangement of the toothed belt or of the toothed wheel following the rail at a certain equidistant distance.

If therefore the second drive means is a toothed wheel, for example, a corner deflection can be implemented with it via a circularly curved second transport section, with the corner deflection preferably taking place over 180° or 90°, with different corner deflection angles in the angular range between 40° and 220°, also being able to be implemented, however. If the corner deflection angle amounts to 180°, for example, this means that two linear transport sections extending vertically above one another or horizontally next to one another can be drive effectively connected to one another via the toothed wheel, with the rail being arcuately curved over an angle of 180° in the region of the corner deflection to connect the rail sections of the two linear transport sections to one another.

If the corner deflection angle in contrast amounts to 90°, for example, two linear transport sections which extend perpendicular to one another and of which at least one can also be vertically oriented if required can be connected to one another via the toothed wheel of the second drive unit. In this respect, the rail is arcuately curved over an angle of 90° in the region of the corner deflection to be able to connect the rail sections of the two transport section to one another that extend perpendicular to one another in the desired manner.

In a corresponding manner, different corner deflection angles between 40° and 220° can also be implemented for which purpose the rail has an arcuately curved design over a corresponding angle.

If the second drive means is configured as a toothed belt, it can undergo a deflection by a circular disk in the region of the second transport section of the transport track configured as a corner deflection in accordance with a further embodiment. The toothed belt thus extends along a circular path in the region of the second transport section so that a corner deflection angle in the range between 40° and 220° and in particular a corner deflection angle of, for example, 90° or 180° can also be implemented with a toothed belt.

In accordance with yet a further embodiment, the first drive means and the second drive means can be oriented such that the engagement with the coupling element in each case takes place from the same side thereof. For this purpose, the coupling element can preferably form an engagement surface, in particular a single engagement surface, for the engagement with the first and second drive means. If therefore a transport device having a transport track closed in itself or revolving in a horizontal plane is looked at, for example, the engagement surface of the coupling element can, for example, be vertically oriented, which means that the two drive means of the drive units move into engagement with the coupling element from the side or laterally. If therefore the first drive unit is, for example, a belt drive having a revolving belt as the first drive means, the belt also revolves in a horizontal plane.

Since the second drive means engages into the same engagement surface of the coupling element as the first drive means, the second drive means thus also extends in a horizontal plane. If therefore the second drive means is a toothed belt or a toothed wheel, this means the that toothed belt or the toothed wheel revolves in a plane that extends in parallel with that plane in which the transport track extends.

In accordance with a further embodiment, the engagement surface of the coupling element can form a splined shaft profile, in particular a splined shaft profile of the AT5 type or a similar profile, with the second drive means for the engagement with the coupling element forming a splined shaft profile formed in a complementary manner to the splined shaft profile of the coupling element. Since such splined shaft profiles have rounded tooth flanks regionally, a combined force fitting/shape fitting can occur between the coupling element and the second drive means.

In accordance with a further embodiment, the coupling element can be resiliently supported at the slide, with the coupling element in particular being preloaded perpendicular to its engagement surface. Due to the spring preload, the coupling element is thus reliably pressed toward the respective drive means so that an unwanted slip between the drive means and the coupling element can in particular also be avoided in the region of the first transport section in which the coupling element moves into engagement with the first drive means in a force-fitting manner.

In accordance with a further embodiment, two first springs can in particular be provided of which one is seated upstream of at least one second spring in a first transport direction and the other is seated downstream of at least one second spring in the first direction of travel. In other words, the at least one second spring is therefore located between the two first springs so that the individual springs respond after one another when the slide or its coupling element is, for example, transferred from the first drive unit to the second drive unit. The coupling element can thus gently deflect on the transfer to the second drive unit before the at least one second spring responds.

In accordance with yet a further embodiment, the at least one second spring can be stiffer than the at least one first spring. It can thus be sufficient for the force fitting between the coupling element and a belt drive in the region of the first transport section if the coupling element is only pressed relatively gently toward the belt of the belt drive by means of the first springs to thus be able to cause the required friction locking force for entraining the slide or the coupling element. It can in contrast be desirable in the region of the second transport section to press the coupling element toward the second drive means, that is formed as a toothed wheel, for example, with a greater force and thus in particular to be able to prevent a slip between the coupling element and the toothed wheel when a corner deflection in the vertical is to be implemented. The second spring can accordingly have a greater spring constant than the at least one first spring so that a greater pressing force toward the second drive means can be produced by means of the second spring in the region of the corner deflection.

So that the at least one second spring does not develop any effect as long as the coupling element is in engagement with the first drive means, the coupling element in accordance with a further embodiment, can have a free travel with respect to the at least one second spring such that on the deflection of the first spring, the at least one second spring does not develop any effect until the overcoming of the free travel. So that the second spring can respond in the same manner in the region of the second drive means, the distance of the engagement surface of the first drive means from the slide should here be a little larger than the distance of the engagement surface of the second drive means from the slide. It can hereby be ensured that the spring stroke the coupling element undergoes in the region of the second drive means is a little larger than the spring stroke in the region of the first drive means, whereby the at least one second spring only develops an effect in the desired manner due to the larger spring stroke in the region of the second drive means.

The invention will now be described in the following purely by way of example with reference to the enclosed drawings, wherein.

Figure 1:
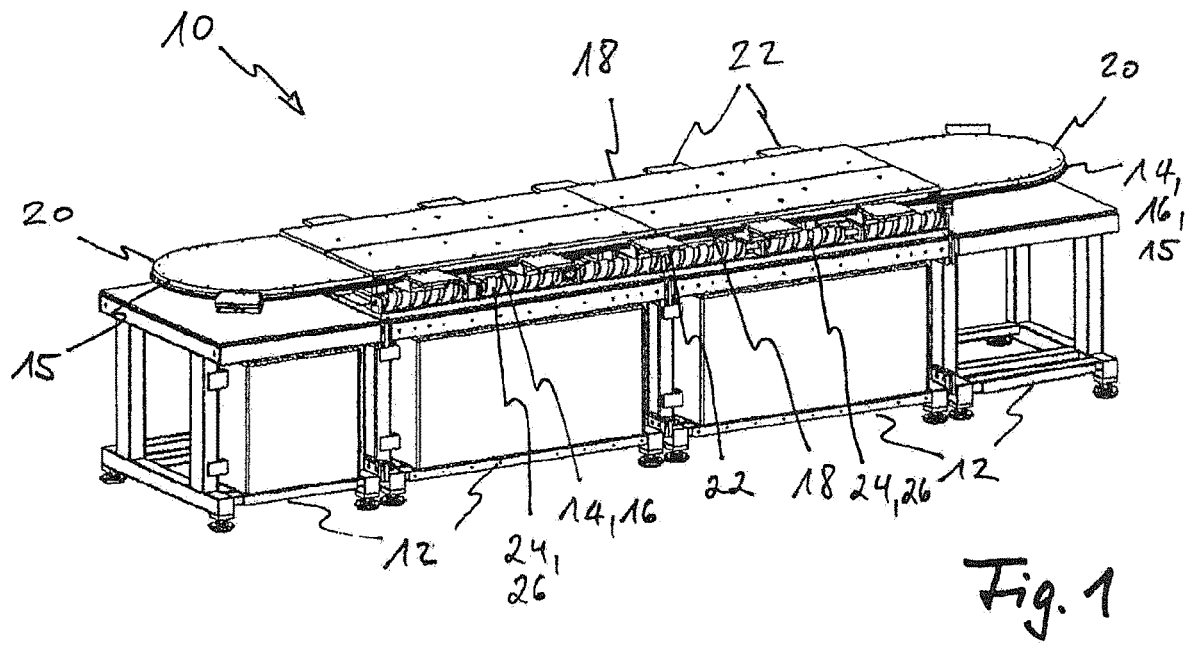
FIG. 1 shows a perspective view of a transport device in accordance with the invention.

FIG. 1 shows a transport device 10 in accordance with the invention in a perspective representation. The transport device 10 has a rail 14 that forms a transport track 16 that revolves or is closed in itself in a horizontal plane, for which purpose this rail 14 is supported by a multi-part base rack 12. The transport track 16 here has two first linear transport sections 18 that extend in parallel with one another and that are each connected to one another at their two ends via a second arcuately curved transport section 20.

A plurality of machining and/or assembly stations along the transport track 16 can be arranged (not shown) along the first transport sections 18 by means of which machining and/or assembly stations workpieces can be machined and/or assembled that are located on slides 22 that are travelably guided along the rail 14. The drive of the slides 14 here takes place along the two first transport sections 18, in particular in the region of the assembly stations, by means of barrel cams 24 in whose drive grooves 26 entrainers (not recognizable) that project from the individual slides 22 engage so that the slides 22 can be traveled along the rail 14 due to a rotary movement of the barrel cams 24. In general, other drives such as linear motors and/or belt drives can, however, also be used in the region of the first transport sections 18. The two first transport sections 18, however, each have a drive unit, in particular a respective belt drive by means of which the individual slides 22 are driven via force fitting or friction locking, at the start or at the end at least to transfer or takeover the individual slides 22 to or from the second arcuately curved transport section 20 as will be explained in more detail in the following.

To be able to transport or transfer the slides 22 from the first transport section 18 at the front in FIG. 1 to the rear first transport section 18, the two transport sections 18 or their rail sections are connected to one another via a semicircularly curved rail piece 15. This semicircularly curved rail piece 15 here defines the second transport section 16, see also FIG. 2 in this respect.

Figure 2:
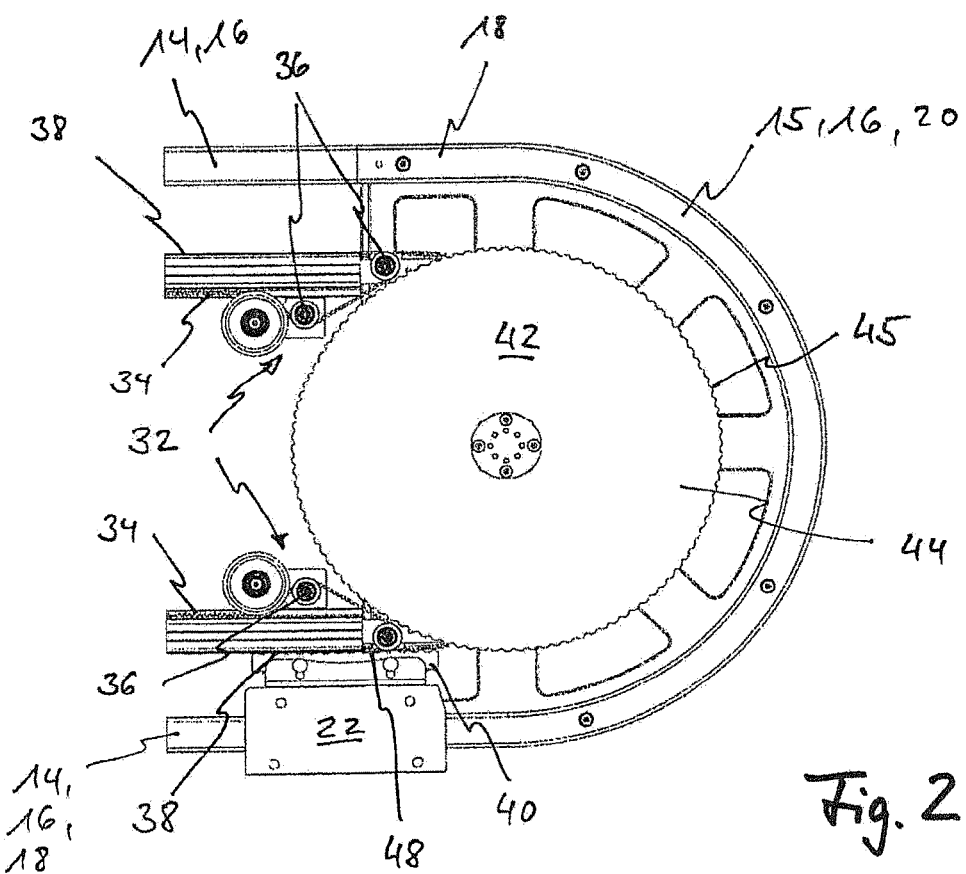
FIGS. 2 and 3 show a plan view of a transport device in accordance with the invention in a corner deflection region in accordance with a first embodiment.

As can furthermore be seen from FIG. 2, the drive of the slides 22 at the start or at the end of the linear first transport sections 18 respectively takes place via a first drive means in the form of a belt drive 32 having a revolving strap, band, or belt 34 as the drive means. The belt 34 can here, for example, be an internally toothed belt that is deflected via a plurality of deflection rollers 36 to form a planar engagement surface 38 that extends at a certain distance in parallel with the rail 14. A coupling element 40 provided at the respective slide 22 can thus move into engagement with the engagement surface 38 formed by the belt 34 via force fitting or friction locking so that the slide 22 can be traveled by means of the belt drive 32 at the rail 14 at the start or end of the first transport sections 18.

Figure 3:
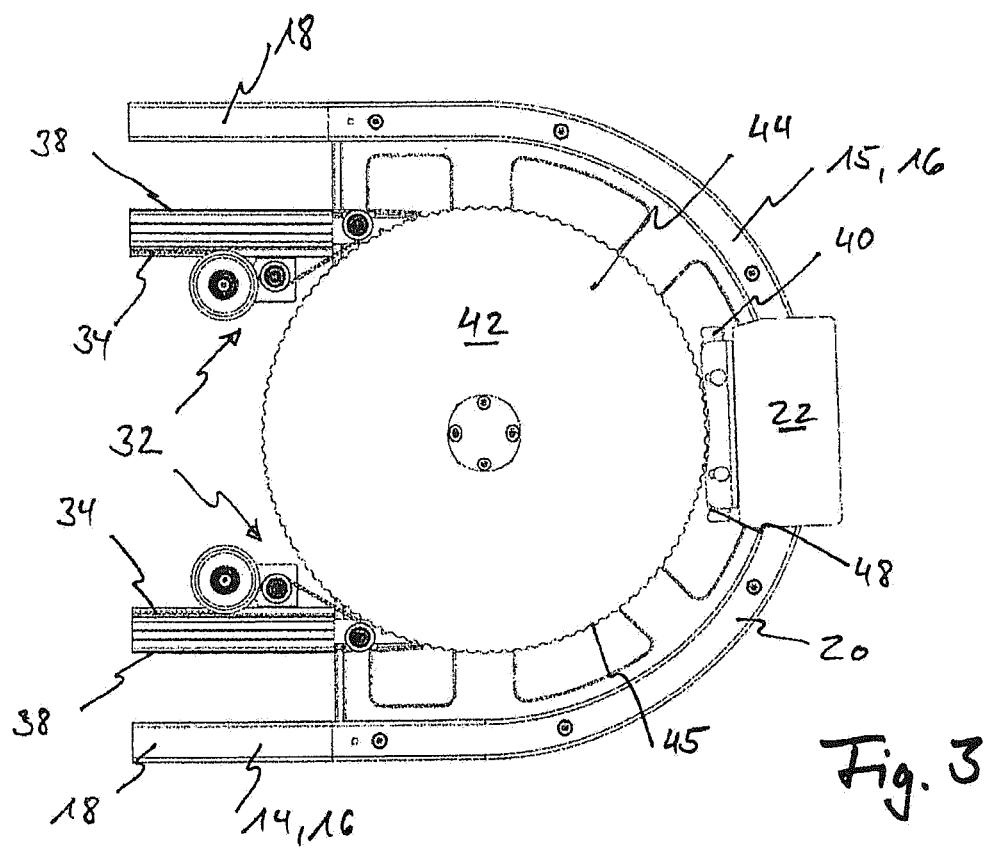

In the region of the second transport section 20 the drive of the slide 22 takes place via a second drive unit 42 in the form of a toothed drive whose drive means is formed in the embodiment in accordance with FIGS. 2 and 3 by a toothed wheel 44, with the axis of rotation of the toothed wheel 44 coinciding with the center of the arcuately curved rail piece 15. The engagement surface in the form of the toothed arrangement 45 of the toothed wheel 44 here follows the rail piece 15 at a certain equidistant distance. The toothed wheel 44 here preferably has a splined shaft profile and in particular a splined shaft profile of the AT5 type to be able to move into engagement in a shape fitting manner with the coupling element 40 of the respective slide 22. For this purpose, the coupling element 40 has an engagement surface 48 that forms a splined shaft profile complementary to the splined shaft profile of the toothed wheel 44. In this manner, a shape fitting or a combined force fitting/shape fitting can be achieved in the region of the second transport section 20 via the coupling element 40 of the slide 22 via which coupling element 40 a force-fitting connection to the band drive 32 is achieved in the region of the first transport sections 18, whereby, on the one hand, an exact positioning can be achieved in the region of the corner deflection. On the other hand, a shape fitting or a combined force fitting/shape fitting achieved in this manner between the coupling element 40 and the drive unit 42 in the region of the corner deflection makes it possible that the total transport track 16 can be vertically oriented such that the two linearly extending first transport sections 18 come to lie vertically above one another. An unwanted slip between the coupling element 40 and the toothed drive 42 can thus not occur due to the shape fitting that could otherwise result in a sagging of the slides 22 in the region of the corner deflection with a vertical orientation of the transport track 16.

As can furthermore be seen from FIG. 2, the belt 34 of the belt drive 32 revolves in the same plane as the toothed wheel 44 of the second drive unit 42, with this plane being in parallel with that plane in which the transport track 16 extends. Since the toothed wheel 44 and the belt 34 revolve in the same plane, the engagement with the coupling element 40 thus takes place from the same side in each case. This engagement surface 48 of the coupling element 40 here forms a splined shaft profile, in particular a splined shaft profile of the AT5 type, in the already described manner that is complementary to the splined shaft profile of the toothed wheel 40 for the shape fitting engagement with the toothed wheel 44.

Figure 4:
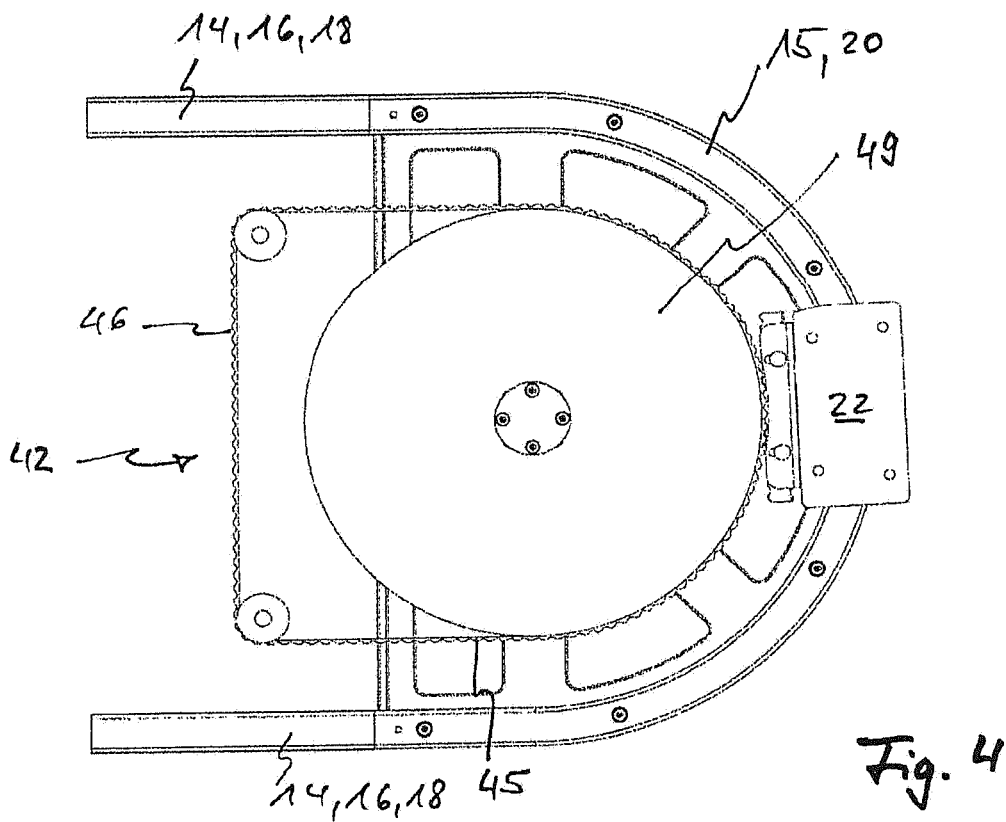
FIG. 4 shows a plan view of a transport device in accordance with the invention in a corner deflection region in accordance with a second embodiment.

In accordance with the embodiment shown in FIG. 4, the drive means of the second drive unit 42 can, alternatively to a toothed wheel, be a toothed belt 46 that undergoes a deflection in the region of the second transport section 20 via a circular disk 49 over which the toothed belt 46 runs and whose center coincides with the center of the arcuately curved rail piece 15. The toothed belt 46 here has an outwardly disposed splined shaft profile as a toothed arrangement 45 that here is in turn also formed complementary to the splined tooth profile of the engagement surface 48 of the coupling element 40 in order thus to be able to cause a shape fitting in the desired manner between the coupling element 40 and the drive means in the form of the toothed belt 46.

For reasons of completeness, it must be noted at this point that for reasons of clarity the two belt drives 32 in the region of the first transport sections 18 are not shown. The drive in the form of a motor for driving the toothed belt 46 is equally not shown in FIG. 4.

Figure 5:
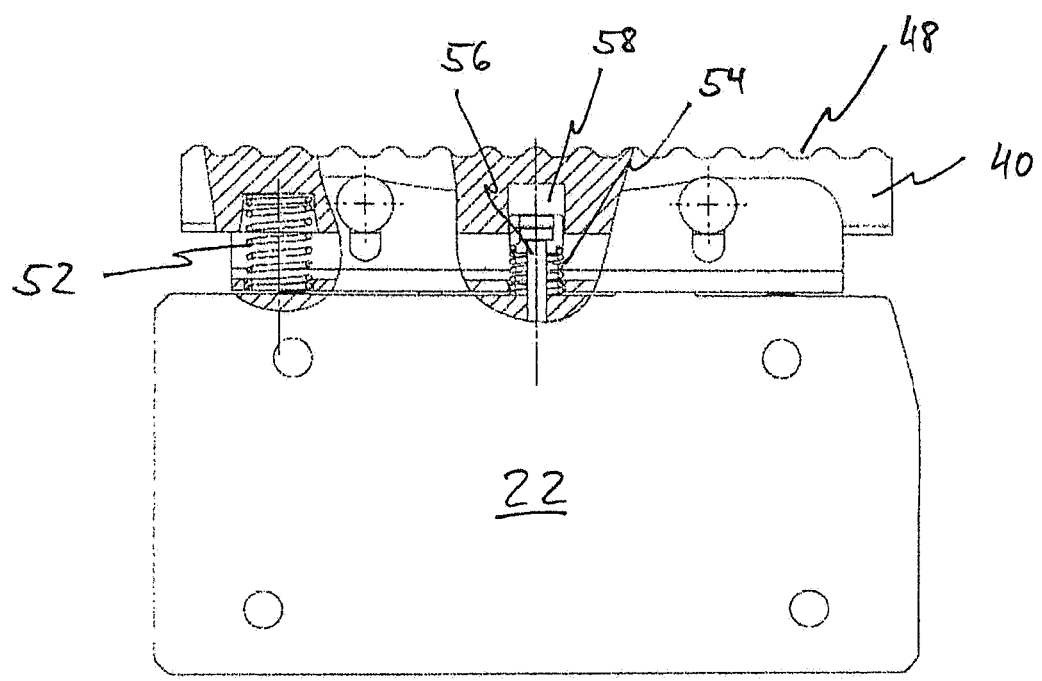
FIG. 5 shows a partly sectioned plan view of the slide of a transport device in accordance with the invention.

As can be seen from FIG. 5, the coupling element 40 is supported at the slide 22 by means of a plurality of springs 52, 54. The support of the coupling element 40 at the slide 22 takes place here by means of two first springs 52 and a second spring 54 that is arranged between the two first springs 52 and that preferably has a greater spring constant than the two first springs 52. The second spring 54 is here compressed and thus preloaded by means of a threaded bolt 56 so that the coupling element 40 has a free travel 58 such that on the deflection of the first springs 52, the second spring 54 does not develop any effect until the overcoming of the free travel 58.

If therefore in accordance with the transition from FIG. 2 to FIG. 3, the side 22 is transferred from the end of the first transport section 18 to the second transport section 20, this has the result that first only the first spring 52 lying at the front in the transport direction is deflected and thus develops an effect. Only when the slide 22 is then completely transferred to the second transport section 20 is the second spring 54 then also active, for which purpose the engagement surface 38 of the belt 34 has a somewhat smaller distance from the rail 14 than the outer peripheral surface or the engagement surface of the toothed wheel 44.

Since the drive of the slides 22 between the barrel cams 24 (see FIG. 1) and the corner deflection 24 takes place via a belt drive 32 in the region of the second transport section 20, not only a synchronized transfer of the individual slides 22 to the second drive unit 42 can be achieved in the region of the second transport section 20 that is based on a shape fitting between the coupling element 40 of the slide 22 and the toothed drive 42; the belt drive 23 rather equally serves as a kind of buffering path in the region of which individual slides 22 can be temporarily parked as required until they can be transferred to the second drive unit 42.

Since the relative position between the slide 22 and the toothed wheel 44 or the toothed belt 46 can be exactly determined on the basis of the shape fitting between the coupling element 40 and the toothed drive 42 in the region of the second transport section 20, a cyclic operation can furthermore be implemented in the region of the second transport section 20 so that one or more assembly stations can also be set up there as required.

Finally, due to the shape fitting achievable between the coupling element 40 and the toothed belt drive 42 in the region of the second transport section 20, the total transport track 16 can be arranged, unlike the horizontal orientation by 90° shown in FIG. 1, tilted by 90° so that the two linearly oriented first transport sections 18 come to lie substantially vertical above one another without a slipping through of the individual slides 22 due to gravity being able to occur in the region of the corner deflection.

REFERENCE NUMERAL LIST 10 transport device
12 base frame
14 rail
15 rail piece, arcuately bent
16 conveyor track
18 first transport section
20 second transport section
22 slide
24 barrel cam
26 drive groove
32 first drive unit/belt drive
34 belt
36 deflection roller
38 engagement surface
40 coupling element
42 second drive unit/toothed drive
44 toothed wheel
45 toothed arrangement
46 toothed belt
48 engagement surface
49 circular disk
52 first spring
54 second spring
56 threaded bolt
58 free travel

The invention claimed is:

1. A transport device for transporting objects along a transport track, the transport device comprising
   a rail that defines the transport track;
   at least one slide that is travelably guided at the rail and that is configured to receive at least one object to be transported;
   a coupling element which is provided at the slide and via which the slide can be driven;
   at least one first drive unit having a first drive means for driving the slide along a first transport section of the transport track; and
   a second drive unit having a second drive means for driving the slide along a second transport section of the transport track,
wherein the coupling element is configured to be in engagement in a force-fitting manner with the first drive means in the region of the first transport section, and wherein the coupling element is further configured to be in engagement in a shape fitting manner or in a shape fitting/force-fitting manner with the second drive means in the region of the second transport section,
   wherein the first drive means and the second drive means are oriented such that the engagement with the coupling element takes place from the same side in each case for which purpose the coupling element has an engagement surface for the engagement with the first drive means and the second drive means, wherein the engagement surface of the coupling element forms a splined shaft profile, with the second drive means forming a splined shaft profile formed in a complementary manner to the splined shaft profile of the coupling element for the engagement with the coupling element.

2. The transport device in accordance with claim 1, wherein the first drive unit is configured as a belt drive having a revolving belt as the first drive means.

3. The transport device in accordance with claim 1, wherein the second drive unit is configured as a toothed drive having a revolving toothed belt or a toothed wheel as the second drive means.

4. The transport device in accordance with claim 1, wherein the rail is curved in the region of the second transport section of the transport track, with the second drive means following the rail.

5. The transport device in accordance with claim 4, wherein the rail is arcuately curved in the region of the second transport section of the transport track.

6. The transport device in accordance with claim 3, wherein the toothed belt undergoes a deflection by a circular disk in the region of the second transport section of the transport track.

7. The transport device in accordance with claim 4, wherein the toothed belt undergoes a deflection by a circular disk in the region of the second transport section of the transport track.

8. The transport device in accordance with claim 1, wherein the first drive means and the second drive means revolve in a common plane that is in parallel with a plane in which the transport track extends.

9. The transport device in accordance with claim 1, wherein the coupling element has a single engagement surface for the engagement with the first drive means and the second drive means.

10. The transport device in accordance with claim 1, wherein the engagement surface of the coupling element forms a splined shaft profile of the AT5 type.

11. The transport device in accordance with claim 1, wherein the coupling element is resiliently supported at the slide.

12. The transport device in accordance with claim 11, wherein the coupling element is preloaded perpendicular to its engagement surface.

13. The transport device in accordance with claim 1, wherein the coupling element is supported by means of at least one first spring and by means of at least one second spring at the slide, with the at least one first spring being seated upstream of the at least one second spring in a first transport direction of the slide.

14. The transport device in accordance with claim 13, wherein two first springs are provided of which one is seated upstream of the at least one second spring in the first travel direction and the other is seated downstream of the at least one second spring in the first travel direction.

15. The transport device in accordance with claim 13, wherein the at least one second spring is stiffer than the at least one first spring.

16. The transport device in accordance with claim 13, wherein the coupling element has a free travel with respect to the at least one second spring such that on a deflection of the first spring, the at least one second spring does not develop any effect until the overcoming of the free travel.

* * * * *